(12) United States Patent
Kuno et al.

(10) Patent No.: US 6,455,168 B2
(45) Date of Patent: Sep. 24, 2002

(54) MOISTUREPROOF HOT MELT COMPOSITION AND MOISTUREPROOF PAPER

(75) Inventors: Tatsuhiro Kuno; Takaichiro Shimokado; Yoshitada Nishikiori, all of Hiroshima (JP)

(73) Assignee: Yasuhara Chemical Co., Ltd., Hiroshima (JP)

(*) Notice: Subject to any disclaimer, the term of this patent is extended or adjusted under 35 U.S.C. 154(b) by 0 days.

(21) Appl. No.: 09/863,411

(22) Filed: May 24, 2001

(30) Foreign Application Priority Data

Jun. 21, 2000 (JP) ........................................ 2000-227964

(51) Int. Cl.$^7$ ................................................ B32B 9/06

(52) U.S. Cl. ........................................................ 428/486

(58) Field of Search ........................... 524/270; 428/486

(56) References Cited

U.S. PATENT DOCUMENTS

| 3,652,725 | A | * | 3/1972 | Diaz | 260/876 |
| 4,140,733 | A | * | 2/1979 | Meyer | 260/897 |
| 4,749,739 | A | * | 6/1988 | Foster | 524/271 |
| 6,239,468 | B1 | * | 12/2001 | Wang | 525/240 |

FOREIGN PATENT DOCUMENTS

| JP | 2001-12238 | 5/2001 |
| JP | 2001-121632 | 5/2001 |

* cited by examiner

*Primary Examiner*—Paul R. Michl
(74) *Attorney, Agent, or Firm*—Sughrue Mion, PLLC

(57) ABSTRACT

A moistureproof hot melt composition comprising polyethylene and/or polypropylene (A) and a tackifier resin (B), component (A), component (B) and wax (C), an ethylene-vinyl acetate copolymer (D) and component (B), or component (D), component (B) and component (C); and moistureproof paper excellent in moistureproof properties and recyclability, low in cost and excellent in productivity, which paper is coated with the above composition.

9 Claims, No Drawings

MOISTUREPROOF HOT MELT COMPOSITION AND MOISTUREPROOF PAPER

FIELD OF THE INVENTION

The present invention relates to a hot melt composition excellent in moistureproof properties, and recyclable moistureproof (laminated) paper using the same, which is excellent in disintegrating properties and moistureproof properties.

BACKGROUND OF THE INVENTION

As moistureproof paper used as packaging paper for newsprint base paper and copying paper, paper coated with polyolefin polymers such as polyethylene and polypropylene have been widely used. The moistureproof paper coated with the polyolefin polymers have the advantages of excellent workability and moistureproof properties and low cost. However, when it is tried to recycle these paper to reuse them, the coating strength of moistureproof layers is too strong to sufficiently disintegrate the paper with a disintegrator in a pulping process. As a result, the olefinic resin layers separated from the paper remain in the pulp as films, which make it impossible to recycle used paper.

In recent years, as recyclable moistureproof paper, moistureproof paper have been proposed which are coated with emulsions comprising synthetic rubber latexes and wax emulsions, or synthetic rubber latexes, wax emulsions and resin emulsions. These moistureproof paper have good moistureproof properties, and also have recyclability. However, they have the disadvantage that a long and large drying apparatus is required and it causes poor productivity, because coating solutions are emulsions.

Further, recently, moistureproof paper coated with a moistureproof hot melt composition mainly composed of an amorphous poly-α-olefin (hereinafter abbreviated as APAO), a tackifier resin and wax has been proposed (Japanese Patent Laid-open Publication (Hei) 09-316252 and Japanese Patent Laid-open Publication (Hei) 11-158330). This moistureproof paper is excellent in moistureproof properties and disintegrating properties, and moreover has the advantage that it can be produced at low cost, because inexpensive APAO is used as a main component. However, the APAO used as a main component is amorphous and soft, so that the coated moistureproof paper is liable to show tackiness. Inhibition of the tackiness tends to bring cracks on a moistureproof layer when the paper is folded. It is therefore difficult to balance various properties. Further, the melt viscosity of the moistureproof hot melt composition is low, so that application thereof to T-die extrusion coating is difficult. Thus, there is a limitation on a coating method of the composition.

SUMMARY OF THE INVENTION

It is therefore an object of the present invention to provide a hot melt composition excellent in moistureproof properties.

Another object of the present invention is to provide moistureproof paper using the same, which is excellent in moistureproof properties and recyclability, low in cost and excellent in productivity.

According to the present invention, there is provided (1) a composition comprising 20% to 90% by weight of polyethylene and/or polypropylene (A) and 10% to 80% by weight of a tackifier resin (B), with the proviso that (A)+(B)=100% by weight (hereinafter also referred to as "composition (1)");

(2) a composition comprising 20% to 90% by weight of the above-mentioned component (A), 5% to 80% by weight of the above-mentioned component (B) and 0.1% to 50% by weight of wax (C), with the proviso that (A)+(B)+(C)=100% by weight (hereinafter also referred as to "composition (2)");

(3) a composition comprising 10% to 90% by weight of an ethylene-vinyl acetate copolymer (D) (hereinafter also referred to as "EVA") and 10% to 90% of the above-mentioned component (B), with the proviso that (D)+(B)=100% by weight (hereinafter also referred as to "composition (3)"); or (4) a composition comprising 10% to 90% by weight of the above-mentioned component (D), 5% to 90% by weight of the above-mentioned component (B) and 0.1% to 50% of the above-mentioned component (C), with the proviso that (D)+(B)+(C)=100% by weight (hereinafter also referred as to "composition (4)").

DETAILED DESCRIPTION OF THE INVENTION

In the moistureproof hot melt composition of the present invention, polyethylene and/or polypropylene (A) or the EVA (D) is used as a base polymer, with which the tackifier resin (B) and/or the wax (C) is further mixed. Accordingly, when the moistureproof hot melt composition is used, the film strength of a moistureproof layer can be kept lower than that of the conventional moistureproof paper with which olefinic polymers are used. It is also possible to achieve disintegration of used paper with a disintegrator in a pulping process on recycling. These polymers (A) or (D) have appropriate hardness and softness, so that various properties required for the moistureproof hot melt composition can be easily balanced, and the MFR (Melt Flow Rate) of the moistureproof hot melt composition can be freely adjusted. Accordingly, the moistureproof hot melt composition of the present invention is applicable to various coaters.

The MFR will be described in detail below.

The MFR is generally used for indicating the fluidity of a resin.

The MFR value is determined by the following method. As to polyethylene or EVA, a material is put in a cylinder having an orifice with a diameter of 2.1 mm and a length of 8 mm, and the material melted is extruded at 190° C. (230° C. for polypropylene) under a load of 2,160 g. The weight of the material extruded for 5 to 240 seconds is measured, and then, converted to gram per 10 minutes, thereby obtaining the MFR value. That is to say, the higher MFR value means the better fluidity (see JIS-K-7210).

The most preferable MFR value of polyethylene and polypropylene (A) used in the present invention varies depending on the coating method of the moistureproof hot melt composition. For example, in T-die extrusion coating, the MFR is preferably from 0.1 to 200 g/10 minutes, more preferably from 0.1 to 50 g/10 minutes, and particularly preferably from 0.1 to 30 g/10 minutes. On the other hand, in coating with a head coater or a roll coater, the MFR is preferably from 30 to 2,000 g/10 minutes, and more preferably from 50 to 2,000 g/10 minutes. It is difficult to obtain polyethylene and polypropylene having an MFR exceeding 2,000 g/10 minutes or less than 0.1 g/10 minutes from the market.

It is preferred that polyethylene constituting component (A) has a tensile breaking strength (in accordance with JIS K6760) of 9.8 to 1,960 N/cm$^2$ (1 to 200 kgf/cm$^2$). When polyethylene having a tensile breaking strength exceeding 1,960 N/cm$^2$ is used, the film strength of the moistureproof hot melt composition of the present invention is increased, resulting in a tendency to poor disintegrating properties.

The compounding ratio of polyethylene and/or polypropylene (A) is from 20% to 90% by weight, preferably from 30% to 80% by weight, and more preferably from 40% to 80% by weight, for a two-component system (composition (1)). When the compounding ratio is less than 20% by weight, a moistureproof layer is liable to have a crack when folded. On the other hand, exceeding 90% by weight results in poor disintegrating properties.

For a three-component system (composition (2)), the compounding ratio thereof is from 20% to 90% by weight, preferably from 30% to 80% by weight, and more preferably from 40% to 70% by weight. When the compounding ratio is less than 20% by weight, a moistureproof layer is liable to have a crack when folded. On the other hand, exceeding 90% by weight results in poor disintegrating properties.

The most preferable MFR of the EVA (D) used in the present invention varies depending on the coating method of the moistureproof hot melt composition and the vinyl acetate content of the EVA (D). For example, in T-die extrusion coating, the MFR is preferably from 0.1 to 200 g/10 minutes, more preferably from 0.1 to 50 g/10 minutes, and particularly preferably from 0.1 to 30 g/10 minutes. On the other hand, in coating with a head coater or a roll coater, the MFR is preferably from 0.1 to 2,000 g/10 minutes, more preferably from 1 to 100 g/10 minutes, and particularly preferably from 1 to 50 g/10 minutes. When the vinyl acetate content of the EVA (D) is from 1% to 15% by weight, an MFR of more than 2,000 g/10 minutes results in the liability of pitch to adhere to a dryer in a drying process of recycling. On the other hand, when the vinyl acetate content exceeds 15% by weight, the range of the MFR within which the above-mentioned problem does not arise is from 0.1 to 100 g/10 minutes. Further, it is difficult to obtain the EVA having an MFR of less than 0.1 g/10 minutes from the market. However, even when the EVA has an MFR higher than 100 g/10 minutes, recycling by mixing it with a large amount of paper or corrugated fiberboard allows the hot melt composition to be dispersed in a large amount of paper. Consequently, pitch becomes difficult to adhere to a dryer to make it possible to use such an EVA.

The compounding ratio of the EVA (D) is from 10% to 90% by weight, and preferably from 25% to 70% by weight, for a two-component system (composition (3)). When the compounding ratio is less than 10% by weight, a moistureproof layer is liable to have a crack when folded. On the other hand, exceeding 90% by weight results in poor disintegrating properties.

For a three-component system (composition (4)), the compounding ratio thereof is from 10% to 90% by weight, and preferably from 25% to 60% by weight. When the compounding ratio is less than 10% by weight, a moisture proof layer is liable to have a crack when folded. On the other hand, exceeding 90% by weight results in poor disintegrating properties.

The tackifier resins (B) used in the present invention include terpene resins, aliphatic resins, aromatic resins, alicyclic resins, coumarone-indene resins, rosin and rosin derivatives etc. The tackifier resins (B) have an effect of enhancing the disintegrating properties and moistureproof properties of the hot melt compositions.

Of these, the terpene resins are resins mainly containing α-pinene, β-pinene and dipentene obtained from pine essential oil. Specific examples of the terpene resins include terpene resins obtained by polymerization of terpene essential oil, terpene-phenol resins and modified aromatic terpene resins.

The aliphatic resins are resins obtained by polymerization of aliphatic monomers formed by thermal decomposition of petroleum naphtha, and monomer sources include the C5 fraction, pentanes, isoprene and 1,3-pentadiene.

The aromatic resins are resins obtained by polymerization of aromatic monomers formed by thermal decomposition of petroleum naphtha, and monomer sources include the C9 fraction and styrenic compounds.

The alicyclic (petroleum) resins are resins having a structure in which carbon atoms are cyclically combined and not belonging to aromatic resins. And the alicyclic resins are produced by using high-purity dicyclopentadiene as a main raw material, obtained by distillation after decomposition of naphtha cracking products. In addition, the C9 fraction, ester-containing monomers and hydroxyl group-containing monomers are sometimes used for modification.

The alicyclic petroleum resins are produced by thermal polymerization or cationic polymerization of dicyclopentadiene. They have formerly been obtained by cationic polymerization of relatively low-purity dicyclopentadiene in many cases. Recently, however, they have been produced by thermal polymerization of high-purity dicyclopentadiene in many cases.

The coumarone-indene resins are relatively low molecular weight resins mainly composed of polymerization products of coumarone and indene.

The rosin is pale yellow to brown, hard and brittle resins having a softening point of 70 to 85° C., and includes three kinds of gum rosin obtained from pine oleoresin collected from living pine trees as a raw material, wood rosin obtained by extraction with a petroleum solvent from pine stumps and tall oil rosin obtained from waste liquid in producing kraft pulp.

The rosin derivatives include rosin modified by hydrogenation, disproportionation or dimerization, and rosin esterified with various alcohols such as methanol, glycols, glycerol and pentaerythritol.

Although any of the above tackifier resins (B) maybe used, the terpene resins and the alicyclic resins are preferred because of their excellent moistureproof properties.

The compounding amount of the tackifier resin (B) is from 10% to 80% by weight, and preferably from 20% to 60% by weight, for the two-component system (composition (1)). For the three-component system (composition (2)), the compounding ratio of the tackifier resin is from 5% to 80% by weight, preferably from 5% to 60% by weight, and more preferably from 5% to 40% by weight.

Further, for the two-component system (composition (3)), the compounding amount thereof is from 10% to 90% by weight, and preferably from 20% to 70% by weight. For the tree-component system (composition (4)), the compounding ratio thereof is from 5% to 90% by weight, preferably from 5% to 70% by weight, and more preferably from 20% to 50% by weight.

When the compounding ratio of the tackifier resin (B) is less than the above-mentioned value, disintegrating properties and moistureproof properties are deteriorated. On the other hand, when the compounding ratio thereof exceeds the above-mentioned value, a moistureproof layer is liable to have a crack when folded.

The softening point (in accordance with JIS K6714) of the tackifier resin (B) is preferably from 70 to 190° C., and more preferably from 100 to 190° C. When the softening point is less than 70° C., the tackiness is liable to appear, which causes pitch to adhere to a dryer in a drying process when processed moistureproof paper is recycled. On the other hand, it is difficult to obtain the resins having a softening point of higher than 190° C. from the market.

The wax (C) used in the present invention includes paraffin wax, microcrystalline wax, carnauba wax, Fischer-Tropsch wax, polyethylene wax, polypropylene wax etc.

Of these, the paraffin wax means a crystalline paraffin hydrocarbon mixture contained in petroleum. A main component thereof is generally a straight chain paraffin having about 18 to about 30 carbon atoms. It has a molecular weight of 300 to 500, and a melting point/softening point of about 45 to about 70° C.

The microcrystalline wax is a hydrocarbon of 30 to 60 carbon atoms extracted from the heavy lubricating oil fraction of petroleum, rich in non-straight chain components. It shows yellow, and variously changes in hardness and viscosity. It has a molecular weight of 450 to 700, and a melting point/softening point of about 70 to about 90° C.

The carnauba wax is obtained by collecting a resin allowed to ooze out of leaves and leaf buds of carnauba palm trees, putting the resin into boiling water, and collecting a melt floating on the surface. It has a melting point/softening point of about 80 to about 86° C., and a main component thereof is a cerotic acid ester of myricyl alcohol.

The Fischer-Tropsch wax is wax formed as a by-product in producing synthetic petroleum from coal by the Fischer-Tropsch process. It has a molecular weight of 800 to 1,300, and a melting point/softening point of about 95 to about 115° C.

The polyethylene wax is wax obtained by direct polymerization of ethylene, thermal decomposition of low-density polyethylene or purification of a by-product formed in the production process of high-density polyethylene. It has a molecular weight of 500 to 8,000, and a melting point/softening point of about 100 to about 140° C.

The polypropylene wax is wax obtained by direct polymerization of propylene or thermal decomposition of polypropylene. It has a molecular weight of about 3,000 to about 50,000.

The wax (C) has the effects of decreasing the tackiness of the hot melt composition and enhancing moistureproof properties. As the wax (C), any wax may be used. However, wax having a melting point of 100 to 170° C. is preferably used. The use of wax having a melting point of less than 100° C. results in the liability of pitch to adhere to a dryer in recycling process. On the other hand, it is difficult to obtain wax having a melting point of higher than 170° C. from the market.

The compounding amount of the wax (C) is from 0.1% to 50% by weight, preferably from 5% to 40% by weight, and more preferably from 10% to 35% by weight, for the three-component system (composition (2)). For the three-component system (composition (4)), the compounding ratio thereof is from 0.1% to 50% by weight, preferably from 5% to 50% by weight, and more preferably from 10% to 40% by weight.

When the compounding ratio of the wax (C) is less than the above-mentioned value, the effect of inhibiting the tackiness of a moistureproof layer is not sufficiently exhibited, resulting in a performance substantially similar to that of the two-component system. On the other hand, when the compounding ratio thereof exceeds the above-mentioned value, the moistureproof layer is liable to have a crack when folded.

The moistureproof hot melt composition of the present invention is obtained by mixing the above-mentioned components (A) and (B) (composition (1)), components (A) to (C) (composition (2)), components (D) and (B) (composition (3)) or components (D), (B) and (C) (composition (4)). However, the composition of the present invention can contain an additive such as a filler, for example, calcium carbonate, titanium oxide, barium sulfate, talc, clay or carbon black, a lubricant, an anti-fogging agent, an antioxidant, an ultraviolet absorber, a flame retardant, a colorant, a plasticizer or oil, as long as it dose not impair the effects of the present invention. There is no particular limitation on these additives, and additives which have been used in the hot melt compositions and have hitherto been known are used.

Coaters used for the moistureproof hot melt composition of the present invention are not limited. Examples of them include such as a T-die extrusion coater, a roll coater and a head coater in which the composition melted by heating is used. In particular, the T-die extrusion coater is preferred, because fine coating films having no pinhole can be obtained at high speed and the thickness of the coating films can be easily decreased. The moistureproof hot melt composition of the present invention having a low MFR can be easily processed with the conventional T-die extrusion coater to produce moistureproof paper at low cost. When processed with the T-die extrusion coater, the moistureproof hot melt composition having an MFR of 1 to 500 g/10 minutes is used. The MFR is preferably from 1 to 300 g/10 minutes, more preferably from 1 to 200 g/10 minutes, and particularly preferably from 1 to 100 g/10 minutes. Using the composition having an MFR exceeding 500 g/10 minutes, it becomes difficult to process with the T-die extrusion coater because of too low melt viscosity thereof. On the other hand, using the composition having an MFR of less than 1 g/10 minutes, it becomes difficult to process it with the T-die extrusion coater because of too high melt viscosity thereof.

The melting temperature of the moistureproof hot melt composition of the present invention in melt coating is usually from 150 to 250° C., and preferably from 180 to 230° C. Although the coating amount is not particularly limited, it is usually from 5 to 40 g/m$^2$, and preferably from 10 to 25 g/m$^2$.

The moistureproof hot melt composition of the present invention having a low MFR can be continuously produced with an extruder suitably. On the other hand, the composition having a high MFR can be suitably produced with a blender or a kneader equipped with an extruder. However, there is no particular limitation on the method for producing the hot melt composition.

Coating types of the hot melt composition of the present invention include, but are not limited to coating on one side of paper, coating on both sides of paper and sandwich coating between paper and paper. Any coating types may be used.

Paper to be coated with the moistureproof hot melt composition of the present invention are not limited, and any paper may be used. Examples of them include such as unbleached kraft paper, bleached kraft paper, paperboard and liner paper. Although there is no particular limitation on the basis weight of paper, it is preferably from 50 to 200 g/m$^2$.

The moistureproof paper coated with the moistureproof hot melt composition of the present invention has more excellent moistureproof properties than moistureproof paper coated with a conventional olefin resin such as polyethylene or polypropylene, and also has excellent disintegrating properties. In the present invention, inexpensive polyethylene and/or polypropylene or the EVA is used as the base polymer, so that the raw material cost can be lowered. Further, the moistureproof hot melt composition of the present invention is excellent in processability, and thin coating films having no pinhole can be obtained with any coater. By use of the moistureproof hot melt composition of the present invention, the processing cost can be lowered, thus the recyclable moistureproof paper can be supplied at a low price.

The present invention will be illustrated with reference to production examples and examples in more detail below, but these examples are not intended to limit the scope of the invention. Parts and percentages hereinafter used are on a weight basis, unless otherwise specified.

Components (A) and (D) were prepared as follows:

(A-1): Low-density polyethylene, a trial product (MFR: 1,000 g/10 minutes, density: 0.92 to 0.93 g/cm$^3$)

(D-1): EVA, a trial product (MFR: 200 g/10 minutes, vinyl acetate content: 10%)

EXAMPLE 1

22.5 parts of low-density polyethylene (SUMIKATHENE G-808: manufactured by Sumitomo Chemical Co., Ltd., density: 0.914 g/cm$^3$, MFR: 200 g/10 minutes, tensile breaking strength: 804 N/cm$^2$ (82 kgf/cm$^2$)), 35 parts of low-density polyethylene (PETROTHENE 212: manufactured by Tosoh Corp., density: 0.919 g/cm$^3$, MFR: 13 g/10 minutes, tensile breaking strength: 1,275 N/cm$^2$ (130 kgf/cm$^2$)), 15 parts of a terpene-phenol resin (YS POLYSTER S-145: manufactured by Yasuhara Chemical Co., Ltd., softening point: 145° C.) and 27.5 parts of polyethylene wax (NEOWAX L: manufactured by Yasuhara Chemical Co., Ltd., melting point: 110° C.) were kneaded in an NR II-46 extruder manufactured by Freesia Macross Corp. to form pellets, which were applied in an amount coated of 22 g/m$^2$ onto kraft paper having a basis weight of 75 g/m$^2$ by use of a YEL 350-40 laminator manufactured by YAMAGUCHI MECHATRONICS (T-die extrusion coater), thereby obtaining a moistureproof paper sample.

EXAMPLE 2

Using 40 parts of EVA (ULTRATHENE 537: manufactured by Tosoh Corp., MFR: 8.5 g/10 minutes, vinyl acetate content: 6%), 30 parts of a modified aromatic terpene resin (YS Resin TO-125: manufactured by Yasuhara Chemical Co., Ltd., softening point: 125° C.) and 30 parts of polyethylene wax (NEOWAX L: manufactured by Yasuhara Chemical Co., Ltd., melting point: 110° C.), a moistureproof paper sample was obtained in the same manner as with Example 1.

EXAMPLE 3

Using 50 parts of polypropylene (F8090: manufactured by Chisso Polypro Co., Ltd., MFR: 21 g/10 minutes), 6.8 parts of low-density polyethylene (SUMIKATHENE L705: manufactured by Sumitomo Chemical Co., Ltd., density: 0.918 g/cm$^3$, MFR: 7 g/10 minutes, tensile breaking strength: 1,373 N/cm$^2$ (140 kgf/cm$^2$)), 20.5 parts of a hydrogenated terpene resin (CLEARON P-125: manufactured by Yasuhara Chemical Co., Ltd., softening point: 125° C.) and 22.7 parts of polypropylene wax (HI-WAX NP805: manufactured by Mitsui Chemicals, Inc., melting point: 145/152° C.), a moistureproof paper sample was obtained in the same manner as with Example 1.

EXAMPLE 4

50 parts of low-density polyethylene (PETROTHENE 212: manufactured by Tosoh Corp., density: 0.919 g/cm$^3$, MFR: 13 g/10 minutes, tensile breaking strength: 1,275 N/cm$^2$ (130 kgf/cm$^2$)) and 50 parts of a modified aromatic terpene resin (YS Resin TO-125: manufactured by Yasuhara Chemical Co., Ltd., softening point: 125° C.) were kneaded in an NR II-46 extruder manufactured by Freesia Macross Corp. to form pellets, which were applied in an amount coated of 22 g/m$^2$ onto kraft paper having a basis weight of 75 g/m$^2$ to form a sandwich structure using a YEL 350-40 laminator manufactured by YAMAGUCHI MECHATRONICS, thereby obtaining a moistureproof paper sample.

EXAMPLE 5

Using 45 parts of EVA (ULTRATHENE 537: manufactured by Tosoh Corp., MFR: 8.5 g/10 minutes, vinyl acetate content: 6%) and 55 parts of a modified aromatic terpene resin (YS Resin TO-125: manufactured by Yasuhara Chemical Co., Ltd., softening point: 125° C.), a moistureproof paper sample was obtained in the same manner as with Example 4.

EXAMPLE 6

60 parts of low-density polyethylene (SUMIKATHENE G-808: manufactured by Sumitomo Chemical Co., Ltd., density: 0.914 g/cm$^3$, MFR: 200 g/10 minutes, tensile breaking strength: 804 N/cm$^2$ (82 kgf/cm$^2$)), 12.5 parts of a modified aromatic terpene resin (YS Resin TO-125: manufactured by Yasuhara Chemical Co., Ltd., softening point: 125° C.) and 27.5 parts of polyethylene wax (NEOWAX L: manufactured by Yasuhara Chemical Co., Ltd., melting point: 110° C.) were melt-mixed in a mixing tank equipped with a stirrer at 180° C., and the resulting mixture was applied in an amount coated of 22 g/m$^2$ onto kraft paper having a basis weight of 100 g/m$^2$ by use of a head coater manufactured by Meltex Inc., thereby obtaining a moistureproof paper sample.

EXAMPLE 7

Using 60 parts of low-density polyethylene (Nipolon L M-76: manufactured by Tosoh Corp., density: 0.920 g/cm$^3$, MFR: 30 g/10 minutes, tensile breaking strength: 784 N/cm$^2$ (80 kgf/cm$^2$)), 12.5 parts of a modified aromatic terpene resin (YS Resin TO-125: manufactured by Yasuhara Chemical Co., Ltd., softening point: 125° C.) and 27.5 parts of polyethylene wax (NEOWAX L: manufactured by Yasuhara Chemical Co., Ltd., melting point: 110° C.), a moistureproof paper sample was obtained in the same manner as with Example 6.

EXAMPLE 8

Using 60 parts of low-density polyethylene (A-1: trial product, MFR: 1,000 g/10 minutes), 12.5 parts of a modified aromatic terpene resin (YS Resin TO-125: manufactured by Yasuhara Chemical Co., Ltd., softening point: 125° C.) and 27.5 parts of polyethylene wax (NEOWAX L: manufactured by Yasuhara Chemical Co., Ltd., melting point: 110° C.), a moistureproof paper sample was obtained in the same manner as with Example 6.

EXAMPLE 9

Using 70 parts of low-density polyethylene (SUMIKATHENE G-807: manufactured by Sumitomo Chemical Co., Ltd., density: 0.919 g/cm$^3$, MFR: 72 g/10 minutes, tensile breaking strength: 784 N/cm$^2$ (80 kgf/cm$^2$)), 10 parts of a modified aromatic terpene resin (YS Resin TO-125: manufactured by Yasuhara Chemical Co., Ltd., softening point: 125° C.) and 20 parts of polyethylene wax (NEOWAX L: manufactured by Yasuhara Chemical Co., Ltd., melting point: 110° C.), a moistureproof paper sample was obtained in the same manner as with Example 6.

EXAMPLE 10

Using 30 parts of low-density polyethylene (SUMIKATHENE G-807: manufactured by Sumitomo Chemical Co., Ltd., density: 0.919 g/cm$^3$, MFR: 72 g/10 minutes, tensile breaking strength: 784 N/cm$^2$ (80 kgf/cm$^2$)), 30 parts of a modified aromatic terpene resin (YS Resin TO-125: manufactured by Yasuhara Chemical Co., Ltd., softening point: 125° C.) and 40 parts of polyethylene wax (NEOWAX L: manufactured by Yasuhara Chemical Co., Ltd., melting point: 110° C.), a moistureproof paper sample was obtained in the same manner as with Example 6.

EXAMPLE 11

Using 50 parts of polypropylene (S13B: manufactured by Grand Polymer Co., Ltd., MFR: 700 g/10 minutes), 25 parts of a hydrogenated terpene resin (CLEARON P-125: manufactured by Yasuhara Chemical Co., Ltd., softening point: 125° C.) and 25 parts of polypropylene wax (HI-WAX NP805: manufactured by Mitsui Chemicals, Inc., melting point: 145/152° C.), a moistureproof paper sample was obtained in the same manner as with Example 6.

EXAMPLE 12

Using 35 parts of EVA (D-1: trial product, MFR: 200 g/10 minutes, vinyl acetate content: 10%), 40 parts of an alicyclic resin (ARKON. P-135: manufactured by Arakawa Chemical Industries, Ltd., softening point: 135° C.) and 25 parts of polypropylene wax (HI-WAX NP055: manufactured by Mitsui Chemicals, Inc., melting point: 136/145° C.), a moistureproof paper sample was obtained in the same manner as with Example 6.

EXAMPLE 13

Using 35 parts of EVA (P-1207: manufactured by Du Pont-Mitsui Polychemicals Co., Ltd., MFR: 12 g/10 minutes, vinyl acetate content: 12%), 40 parts of an alicyclic resin (ARKON. P-135: manufactured by Arakawa Chemical Industries, Ltd., softening point: 135° C.) and 25 parts of polypropylene wax (HI-WAX NP055: manufactured by Mitsui Chemicals, Inc., melting point: 136/145° C.), a moistureproof paper sample was obtained in the same manner as with Example 6.

EXAMPLE 14

Using 40 parts of EVA (EV 420: manufactured by Du Pont-Mitsui Polychemicals Co., Ltd., MFR: 150 g/10 minutes, vinyl acetate content: 19%), 30 parts of a modified aromatic terpene resin (YS Resin TO-125: manufactured by Yasuhara Chemical Co., Ltd., softening point: 125° C.) and 30 parts of polyethylene wax (NEOWAX L: manufactured by Yasuhara Chemical Co., Ltd., melting point: 110° C.), a moistureproof paper sample was obtained in the same manner as with Example 6.

EXAMPLE 15

Using 80 parts of EVA (P-1207: manufactured by Du Pont-Mitsui Polychemicals Co., Ltd., MFR: 12 g/10 minutes, vinyl acetate content: 12%), 15 parts of an alicyclic resin (ARKON. P-135: manufactured by Arakawa Chemical Industries, Ltd., softening point: 135° C.) and 5 parts of polypropylene wax (HI-WAX NP055: manufactured by Mitsui Chemicals, Inc., melting point: 136/145° C.), a moistureproof paper sample was obtained in the same manner as with Example 6.

EXAMPLE 16

Using 70 parts of EVA (P-1207: manufactured by Du Pont-Mitsui Polychemicals Co., Ltd., MFR: 12 g/10 minutes, vinyl acetate content: 12%), 20 parts of an alicyclic resin (ARKON. P-135: manufactured by Arakawa Chemical Industries, Ltd., softening point: 135° C.) and 10 parts of polypropylene wax (HI-WAX NP055: manufactured by Mitsui Chemicals, Inc., melting point: 136/145° C.), a moistureproof paper sample was obtained in the same manner as with Example 6.

EXAMPLE 17

Using 10 parts of EVA (P-1207: manufactured by Du Pont-Mitsui Polychemicals Co., Ltd., MFR: 12 g/10 minutes, vinyl acetate content: 12%), 10 parts of EVA (EV45X: manufactured by Du Pont-Mitsui Polychemicals Co., Ltd., MFR: 95 g/10 minutes, vinyl acetate content 46%), 40 parts of an alicyclic resin (ARKON. P-135: manufactured by Arakawa Chemical Industries, Ltd., softening point: 135° C.) and 40 parts of polyethylene wax (NEOWAX L: manufactured by Yasuhara Chemical Co., Ltd., melting point: 110° C.), a moistureproof paper sample was obtained in the same manner as with Example 6.

EXAMPLE 18

Using 35 parts of EVA (EV220: manufactured by Du Pont-Mitsui Polychemicals Co., Ltd., MFR: 150 g/10 minutes, vinyl acetate content: 28%), 40 parts of an alicyclic resin (ARKON. P-135: manufactured by Arakawa Chemical Industries, Ltd., softening point: 135° C.) and 25 parts of polyethylene wax (NEOWAX L: manufactured by Yasuhara Chemical Co., Ltd., melting point: 110° C.), a moistureproof paper sample was obtained in the same manner as with Example 6.

Comparative Example 1

100 parts of low-density polyethylene (SUMIKATHENE L705: manufactured by Sumitomo Chemical Co., Ltd., density: 0.918 g/cm$^3$, MFR: 7 g/10 minutes, tensile breaking strength: 1,373 N/cm$^2$ (140 kgf/cm$^2$)) was applied in an amount coated of 22g/m$^2$ onto kraft paper having a basis weight of 75 g/m$^2$ by use of a YEL 350–40 laminator manufactured by YAMAGUCHI MECHATRONICS, thereby obtaining a moistureproof paper sample.

Comparative Example 2

Using 100 parts of EVA (P-1207: manufactured by Du Pont-Mitsui Polychemicals Co., Ltd., MFR: 12 g/10 minutes, vinyl acetate content: 12%), a moistureproof paper sample was obtained in the same manner as with Comparative Example 1.

Comparative Example 3

Using 10 parts of low-density polyethylene (SUMIKATHENE G-808: manufactured by Sumitomo Chemical Co., Ltd., density: 0.914 g/cm$^3$, MFR: 200 g/10 minutes, tensile breaking strength: 804 N/cm$^2$ (82 kgf/cm$^2$)), 50 parts of a modified aromatic terpene resin (YS Resin TO-125: manufactured by Yasuhara Chemical Co., Ltd., softening point: 125° C.) and 40 parts of polyethylene wax (NEOWAX L: manufactured by Yasuhara Chemical Co., Ltd., melting point: 110° C.), a moistureproof paper sample was obtained in the same manner as with Example 6.

Comparative Example 4

Using 10 parts of low-density polyethylene (SUMIKATHENE G-808: manufactured by Sumitomo Chemical Co., Ltd., density: 0.914 g/cm$^3$, MFR: 200 g/10 minutes, tensile breaking strength: 804 N/cm$^2$ (82 kgf/cm$^2$)) and 90 parts of a modified aromatic terpene resin (YS Resin TO-125: manufactured by Yasuhara Chemical Co., Ltd., softening point: 125° C.), a moistureproof paper sample was obtained in the same manner as with Example 6.

Comparative Example 5

Using 50 parts of low-density polyethylene (SUMIKATHENE G-808: manufactured by Sumitomo Chemical Co., Ltd., density: 0.914 g/cm$^3$, MFR: 200 g/10 minutes, tensile breaking strength: 804 N/cm$^2$ (82 kgf/cm$^2$)) and 50 parts of polyethylene wax (NEOWAX L: manufactured by Yasuhara Chemical Co., Ltd., melting point: 110° C.), a moistureproof paper sample was obtained in the same manner as with Example 6.

Comparative Example 6

Using 50 parts of EVA (P-1207: manufactured by Du Pont-Mitsui Polychemicals Co., Ltd., MFR: 12 g/10 minutes, vinyl acetate content: 12%) and 50 parts of polyethylene wax (NEOWAX L: manufactured by Yasuhara Chemical Co., Ltd., melting point: 110° C.), a moistureproof paper sample was obtained in the same manner as with Example 6.

The above-mentioned moistureproof hot melt compositions were evaluated by the following methods. Results thereof are shown in Tables 1 to 5.

Melt Flow Rate (MFR)

The method for determining the MFR has been described above.

Disintegrating Property

Ten grams of a moistureproof paper sample was cut to 1.5 cm×1.5 cm pieces, and placed in a TAPPI standard disintegrator together with 500 ml of hot water at 40° C. The resulting mixture was stirred at 3,000 rpm for 30 minutes, followed by papermaking again. Then, the disintegrating property was visually evaluated. The evaluation criterion is as follows:

⊚: Very good
○: Good
Δ: Fair
X: Poor

Moisture Permeability

The moisture permeability was measured by the cup method (JIS Z 0208). The moisture permeability was measured for a flat plate form and a cross-folded form. As to the cross-folded form, a sample was folded at a center potion thereof, and further folded perpendicularly to the fold at a center potion thereof. Then, a roll having a weight of 2 kg was allowed to move back and forth twice thereon to crease the sample, followed by measurement of the moisture permeability.

Extrusion Coating Suitability

In T-die extrusion coating, it was visually observed whether a sample can be processed without troubles such as surging and film cracking or not, and the extrusion coating suitability was evaluated based on the following criterion:

○: Good
Δ: Fair
X: Poor

Head Coating Suitability

In head coating, it was visually observed whether a sample can be processed without troubles such as grazes and pinholes or not, and the head coating suitability was evaluated based on the following criterion:

○: Good
Δ: Fair
X: Poor

Tackiness

The tackiness of a surface of a moistureproof paper sample was evaluated by the finger touch test. The evaluation criterion is as follows:

○: Good (No tackiness was detected.)
Δ: Fair
X: Poor (Tackiness was detected.)

Pitch Adhesion

The deposit of pitch on the dryer in the drying process was visually evaluated based on the following criterion:

○: Good (No pitch adhered to a dryer.)
Δ: Fair (Pitch adhered in small amounts.)
X: Poor (Pitch adhered in large amounts.)

TABLE 1

| Example | 1 | 2 | 3 | 4 | 5 |
|---|---|---|---|---|---|
| Compounding ratio (parts) | | | | | |
| (A) Polyethylene | | | | | |
| SUMIKATHENE G-808 | 22.5 | 0 | 0 | 0 | 0 |
| SUMIKATHENE L-705 | 0 | 0 | 6.8 | 0 | 0 |
| PETROTHENE 212 | 35.0 | 0 | 0 | 50.0 | 0 |
| (A) Polypropylene | | | | | |
| F8090 | 0 | 0 | 50.0 | 0 | 0 |
| (D) EVA | | | | | |
| ULTRATHENE 537 | 0 | 40.0 | 0 | 0 | 45.0 |
| (B) Tackifier Resin | | | | | |
| YS Resin TO-125 | 0 | 30.0 | 0 | 50.0 | 55.0 |
| CLEARON P-125 | 0 | 0 | 20.5 | 0 | 0 |
| YS POLYSTER S-145 | 15.0 | 0 | 0 | 0 | 0 |
| (C) Polyethylene Wax | | | | | |
| NEOWAX L | 27.5 | 30.0 | 0 | 0 | 0 |
| (C) Polypropylene Wax | | | | | |
| HI-WAX NP-805 | 0 | 0 | 22.7 | 0 | 0 |
| Disintegrating Property | ○ | ⊚ | Δ | ○ | ⊚ |
| Moisture Permeability (g/m$^2$ · 24 h) | | | | | |
| Flat Plate Form | 22 | 28 | 23 | 27 | 33 |
| Cross-Folded Form | 22 | 30 | 23 | 30 | 39 |
| MFR of Compounding Component | 260 | 310 | 180 | 200 | 210 |
| T-die Extrusion Coating Suitability | ○ | Δ | ○ | ○ | ○ |
| Tackiness | ○ | ○ | Δ | — | — |
| Pitch Adhesion | ○ | ○ | ○ | Δ | Δ |

TABLE 2

| Example | 6 | 7 | 8 | 9 | 10 |
|---|---|---|---|---|---|
| Compounding ratio (parts) | | | | | |
| (A) Polyethylene | | | | | |
| SUMIKATHENE G-807 | 0 | 0 | 0 | 70.0 | 30.0 |
| SUMIKATHENE G-808 | 60.0 | 0 | 0 | 0 | 0 |
| Nipolon L M-76 | 0 | 60.0 | 0 | 0 | 0 |
| A-1 | 0 | 0 | 60.0 | 0 | 0 |
| (B) Tackifier Resin | | | | | |
| YS Resin TO-125 | 12.5 | 12.5 | 12.5 | 10.0 | 30.0 |
| (C) Polyethylene Wax | | | | | |
| NEOWAX L | 27.5 | 27.5 | 27.5 | 20.0 | 40.0 |
| Disintegrating Property | ○ | ○ | ◎ | ○ | ◎ |
| Moisture Permeability (g/m² · 24 h) | | | | | |
| Flat Plate Form | 30 | 7 | 8 | 12 | 19 |
| Cross-Folded Form | 35 | 23 | 42 | 20 | 86 |
| MFR of Compounding Component | 640 | 200 | 1680 | 230 | 1100 |
| Head Coating Suitability | ○ | ○ | ○ | ○ | ○ |
| Tackiness | ○ | ○ | ○ | ○ | ○ |
| Pitch Adhesion | ○ | ○ | ○ | ○ | ○ |

TABLE 3

| Example | 11 | 12 | 13 | 14 | 15 |
|---|---|---|---|---|---|
| Compounding ratio (parts) | | | | | |
| (A) Polypropylene | | | | | |
| S-13B | 50.0 | 0 | 0 | 0 | 0 |
| (D) EVA | | | | | |
| D-1 | 0 | 35.0 | 0 | 0 | 80.0 |
| P-1207 | 0 | 0 | 35.0 | 0 | 0 |
| EV 420 | 0 | 0 | 0 | 40.0 | 0 |
| (B) Tackifier Resin | | | | | |
| YS Resin TO-125 | 0 | 0 | 0 | 30.0 | 0 |
| CLEARON P-125 | 25.0 | 0 | 0 | 0 | 0 |
| ARKON. P-135 | 0 | 40.0 | 40.0 | 0 | 15.0 |
| (C) Polyethylene Wax | | | | | |
| NEOWAX L | 0 | 0 | 0 | 30.0 | 0 |
| (C) Polypropylene Wax | | | | | |
| HI-WAX NP-055 | 0 | 25.0 | 25.0 | 0 | 5.0 |
| HI-WAX NP-805 | 25.0 | 0 | 0 | 0 | 0 |
| Disintegrating Property | ○ | ◎ | ◎ | ◎ | Δ |
| Moisture Permeability (g/m² · 24 h) | | | | | |
| Flat Plate Form | 25 | 18 | 18 | 20 | 33 |
| Cross-Folded Form | 30 | 31 | 37 | 23 | 40 |
| MFR of Compounding Component | 1560 | 1250 | 470 | 990 | 350 |
| Head Coating Suitability | ○ | ○ | ○ | ○ | ○ |
| Tackiness | ○ | ○ | ○ | Δ | Δ |
| Pitch Adhesion | ○ | Δ | Δ | Δ | Δ |

TABLE 4

| | Example | | |
|---|---|---|---|
| | 16 | 17 | 18 |
| Compounding ratio (parts) | | | |
| (A) Polyethylene | | | |
| SUMIKATHENE G-808 | 0 | 0 | 0 |
| SUMIKATHENE L-705 | 0 | 0 | 0 |
| (D) EVA | | | |
| P-1207 | 70.0 | 10.0 | 0 |
| EV 220 | 0 | 0 | 35.0 |
| EV 45X | 0 | 10.0 | 0 |
| (B) Tackifier Resin | | | |
| ARKON. P-135 | 20.0 | 40.0 | 40.0 |
| (C) Polyethylene Wax | | | |
| NEOWAX L | 0 | 40.0 | 25.0 |
| (C) Polypropylene Wax | | | |
| HI-WAX NP-055 | 10.0 | 0 | 0 |
| Disintegrating Property | Δ | ◎ | ◎ |
| Moisture Permeability (g/m² · 24 h) Flat Plate Form | 28 | 11 | 16 |
| Cross-Folded Form | 34 | 79 | 21 |
| MFR | 60 | 1110 | 1130 |
| Head Coating Suitability | ○ | ○ | ○ |
| Tackiness | Δ | ○ | Δ |
| Pitch Adhesion | Δ | ○ | Δ |

TABLE 5

| Comparative Example | 1 | 2 | 3 | 4 | 5 | 6 |
|---|---|---|---|---|---|---|
| Compounding ratio (parts) | | | | | | |
| (A) Polyethylene | | | | | | |
| SUMIKATHENE G-808 | 0 | 0 | 10.0 | 10.0 | 50.0 | 0 |
| SUMIKATHENE L-705 | 100 | 0 | 0 | 0 | 0 | 0 |
| (D) EVA | | | | | | |
| P-1207 | 0 | 100 | 0 | 0 | 0 | 50.0 |
| (B) Tackifier Resin | | | | | | |
| YS Resin TO-125 | 0 | 0 | 50.0 | 90.0 | 0 | 0 |
| (C) Polyethylene Wax | | | | | | |
| NEOWAX L | 0 | 0 | 40.0 | 0 | 50.0 | 50.0 |
| (C) Polypropylene Wax | | | | | | |
| HI-WAX NP-805 | 0 | 0 | 0 | 0 | 0 | 0 |
| Disintegrating Property | X | X | ◎ | ◎ | X | X |
| Moisture Permeability (g/m² · 24 h) | | | | | | |
| Flat Plate Form | 48 | 54 | 2 | 2 | 11 | 27 |
| Cross-Folded Form | 57 | 55 | >400 | >400 | 12 | 29 |
| MFR | 7 | 12 | >3000 | >3000 | 890 | 220 |
| T-die Extrusion Coating Suitability | ○ | ○ | — | — | — | — |
| Head Coating Suitability | — | — | ○ | ○ | ○ | ○ |
| Tackiness | ○ | ○ | ○ | ○ | ○ | ○ |
| Pitch Adhesion | X | X | ○ | ○ | ○ | ○ |

As apparent from the results shown in Table 1, the moistureproof hot melt compositions of the present invention, particularly the compositions whose MFR was lowered by use of the low-MFR base polymers were excellent in T-die extrusion coating suitability, disintegrating properties and moistureproof properties.

Further, as shown in Tables 2 to 4, the moistureproof hot melt compositions of the present invention in which the base polymer having high MFR were used were excellent in coating suitability with a head coater, disintegrating properties and moistureproof properties.

On the other hand, as shown in Table 5, the compositions outside the compounding range shown in the present invention were poor in disintegrating properties and/or moistureproof properties.

What is claimed is:

1. A moistureproof paper in which paper is melt coated with a moistureproof hot melt composition comprising 30% to 80% by weight of polyethylene and/or polypropylene (A), 5% to 60% by weight of a tackifier resin (B) and 5% to 40% by weight of wax (C), with the proviso that (A)+(B)+(C)=100% by weight, and having a melt flow ratio (MFR) of 1 to 300 g/10minutes (190° C. under a load of 2,160 g), wherein the tackifier resin (B) is at least one resin selected from the group consisting of a terpene resin, an aliphatic resin, a modified aromatic terpene resin, an alicyclic resin, a coumarone-indene resin, rosin and a rosin derivative, and paper is melt coated at a temperature of 150 to 250° C. with a coating amount of the moistureproof hot melt composition of 5 to 40 g/m$^2$.

2. The moistureproof paper according to claim 1, wherein polyethylene constituting component (A) has a tensile breaking strength of 9.8 to 1,960 N/cm$^2$ (1 to 200 kgf/cm$^2$.

3. The moistureproof paper according to claim 1 or 2, wherein the wax (C) is at least one selected from the group consisiting of paraffin wax, microcrystalline wax, carnauba wax, Fischer-Tropsch wax, polyethylene wax and polypropylene wax.

4. A moistureproof paper in which paper is melt coated with a moistureproof hot melt composition comprising 30% to 80% by weight of an ethylene-vinyl acetate copolymer (D) and 20% to 70% of a tackifier resin (B), with the proviso that (D)+(B)=100% by weight, wherein a tackifier resin (B) is at least one resin selected from the group consisting of a terpene resin, an aliphatic resin, a modified aromatic terpene resin, an alicyclic resin, a coumarone-indene resin, rosin and a rosin derivative, and paper is melt coated at a temperature of 150 to 250° C. with a coating amount of the moistureproof hot melt composition of 5 to 40 g/m$^2$.

5. A moistureproof paper in which paper is melt coated with a moistureproof hot melt composition comprising 25% to 60% by weight of an ethylene-vinyl acetate copolymer (D), 20% to 50% by weight of a tackifier resin (B) and 10% to 40% of wax (C), with the proviso that (D)+(B)+(C)=100% by weight, wherein a tackifier resin (B) is at least one resin selected from the group consisting of a terpene resin, an aliphatic resin, a modified aromatic terpene resin, an alicyclic resin, a coumarone-indene resin, rosin and a rosin derivative, and paper is melt coated at a temperature of 150 to 250° C. with a coating amount of the moistureproof hot melt composition of 5 to 40 g/m$^2$.

6. The moistureproof paper according to claim 4 or 5, wherein the ethylene-vinyl acetate copolymer (D) has a melt flow ratio (MFR) of 0.1 to 200 g/10 minutes (190° C. under a load of 2,160 g).

7. The moistureproof paper according to claim 4 or 5, wherein the ethylene-vinyl acetate copolymer constituting component (D) has a vinyl acetate content of 1% to 15% by weight.

8. The moistureproof paper according to claim 5, wherein the wax (C) is at least one selected from the group consisting of paraffin wax, microcrystalline wax, carnauba wax, Fischer-Tropsch wax, polyethylene wax and polypropylene wax.

9. The moistureproof paper according to any one of claims 1, 4 and 5, wherein the melt coating is T-die extrusion coating.

* * * * *